US010764578B2

(12) United States Patent
Guan et al.

(10) Patent No.: US 10,764,578 B2
(45) Date of Patent: Sep. 1, 2020

(54) BIT RATE OPTIMIZATION SYSTEM AND METHOD

(71) Applicant: KKStream Limited, Taipei (TW)

(72) Inventors: Shuen-Huei Guan, Taipei (TW); Feng-Hsu Tsai, Taipei (TW)

(73) Assignee: KKSTREAM LIMITED, Taipei (TW)

( * ) Notice: Subject to any disclaimer, the term of this patent is extended or adjusted under 35 U.S.C. 154(b) by 0 days.

(21) Appl. No.: 16/374,037

(22) Filed: Apr. 3, 2019

(65) Prior Publication Data

US 2019/0306500 A1 Oct. 3, 2019

(30) Foreign Application Priority Data

Apr. 3, 2018 (TW) ............................. 107111933 A

(51) Int. Cl.
*H04N 19/115* (2014.01)
*H04N 19/139* (2014.01)
*H04N 19/146* (2014.01)
*H04N 19/172* (2014.01)

(52) U.S. Cl.
CPC ......... *H04N 19/115* (2014.11); *H04N 19/139* (2014.11); *H04N 19/146* (2014.11); *H04N 19/172* (2014.11)

(58) Field of Classification Search
CPC .... H04N 19/124; H04N 19/14; H04N 19/172; H04N 19/176; H04N 19/61; H04N 19/105; H04N 19/117; H04N 19/119; H04N 19/136; H04N 19/147; H04N 19/159; H04N 19/192; H04N 19/167; H04N 19/82; H04N 19/12; H04N 19/139; H04N 19/40
See application file for complete search history.

(56) References Cited

U.S. PATENT DOCUMENTS

| | | | |
|---|---|---|---|
| 9,113,147 B2 | 8/2015 | Raveendran et al. | |
| 9,197,912 B2 | 11/2015 | Raveendran et al. | |
| 9,225,983 B2 | 12/2015 | Yang et al. | |
| 9,344,702 B2 | 5/2016 | Bruls | |
| 9,661,328 B2 * | 5/2017 | McCarthy | H04N 19/176 |
| 2006/0222078 A1 * | 10/2006 | Raveendran | H04N 19/14 375/240.16 |
| 2007/0153692 A1 | 7/2007 | Song et al. | |
| 2009/0161770 A1 | 6/2009 | Dong et al. | |
| 2014/0269903 A1 * | 9/2014 | McCarthy | H04N 19/176 375/240.03 |

FOREIGN PATENT DOCUMENTS

| | | |
|---|---|---|
| CN | 100515069 C | 7/2009 |
| CN | 102238382 B | 9/2013 |
| JP | 0918872 A | 1/1997 |
| JP | 2008533841 A | 8/2008 |
| TW | I348866 B | 9/2011 |
| TW | I415473 B | 11/2013 |
| TW | I540878 B | 7/2016 |

\* cited by examiner

*Primary Examiner* — Dave Czekaj
*Assistant Examiner* — Kehinde Abimbola
(74) *Attorney, Agent, or Firm* — McClure, Qualey & Rodack, LLP

(57) ABSTRACT

The present disclosure provides a bit rate optimization method that includes steps as follows. A video is provided. The spatial complexity and temporal complexity of the video are analyzed to evaluate the sensitivity of the human eye to serve as the basis for determining the bit rate of the video.

6 Claims, 2 Drawing Sheets

BIT RATE OPTIMIZATION SYSTEM AND METHOD

RELATED APPLICATIONS

This application claims priority to Taiwan Application Ser. No. 107111933, filed Apr. 3, 2018, which are herein incorporated by reference.

BACKGROUND OF THE INVENTION

Field of Invention

The present invention relates to a system and a method. More particularly, the present invention relates to a bit rate optimization system and a bit rate optimization method.

Description of Related Art

Streaming media is a technology to compress a series of media data, and the media data is transmitted by internet in a segmentation manner. Due to such technology, the media data is transmitted by internet in real time for viewers to watch, and such technology make data package transmit like flowing water.

Conventionally, since bandwidth requirement for streaming media data is huge, the media data shall be compressed first and then transmitted through internet. However, the higher compression, the higher distortion of the media data. As such, how to choose a suitable bit rate becomes an important topic.

SUMMARY OF THE INVENTION

The following presents a simplified summary of the disclosure in order to provide a basic understanding to the reader. This summary is not an extensive overview of the disclosure and it does not identify key/critical elements of the present invention or delineate the scope of the present invention.

One aspect of the present disclosure is directed to a bit rate optimization system. The bit rate optimization system includes a storage device and a processor. The storage device is configured to store a video. The processor is electrically connected to the storage device, wherein the processor analyzes a spatial complexity and a temporal complexity of the video so as to evaluate a sensitivity of human eye to serve as a basis for determining a bit rate of the video, wherein the processor determines whether the spatial complexity cooperating with the temporal complexity is sensitive to human eye through a vision evaluating formula, such that a sensitive information of human eye of each of frames of the video is obtained, wherein the processor execute a standardization process to the sensitive information of human eye of each of frames of the video, and the sensitive information of human eye of each of frames of the video is substituted into a predetermined weight formula so as to obtain the bit rate.

Another aspect of the present disclosure is directed to a bit rate optimization method. The bit rate optimization method includes steps as follows: providing a video; and analyzing a spatial complexity and a temporal complexity of the video so as to evaluate a sensitivity of human eye to serve as a basis for determining a bit rate of the video. The step of evaluating the sensitivity of human eye comprises: determining whether the spatial complexity cooperating with the temporal complexity is sensitive to human eye through a vision evaluating formula, such that sensitive information of human eye of each of frames of the video is obtained. The step of serving as the basis for determining the bit rate of the video comprises: executing a standardization process to the sensitive information of human eye of each of frames of the video, and substituting the sensitive information of human eye of each of frames of the video into a predetermined weight formula so as to obtain the bit rate.

In view of the above embodiments of the present disclosure, it is apparent that the application of the present invention has the advantages as follows. The embodiment of the present disclosure provides a bit rate optimization system and a bit rate optimization method, which allows the bit rate optimization system to choose appropriate bit rate automatically and optimize the transmission bandwidth of the internet, such that the viewers could enjoy the high quality viewing experience through internet under low bandwidth.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows.

Figure 1:
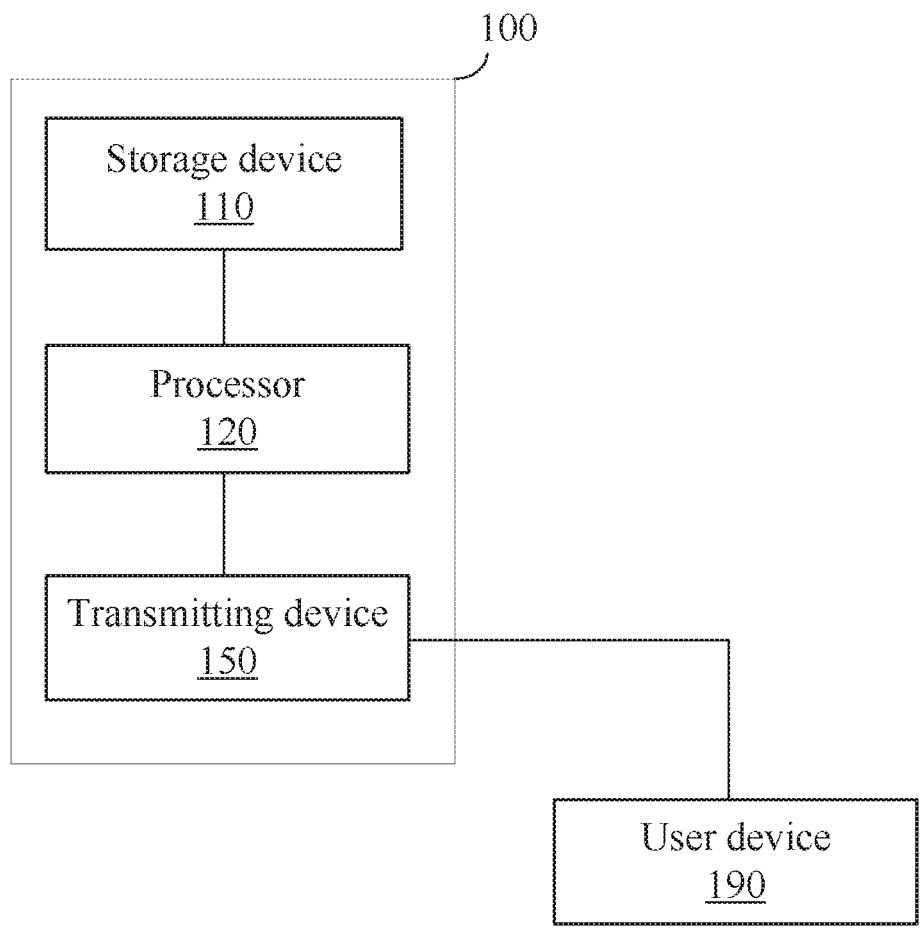
FIG. 1 is a block diagram of a bit rate optimization system according to some embodiments of the present disclosure.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

FIG. 1 is a block diagram of a bit rate optimization system 100 according to some embodiments of the present disclosure. As illustrated in FIG. 1, the bit rate optimization system 100 includes a storage device 110, a processor 120, and a transmitting device 150. With respect to structure, the processor 120 is electrically connected to the storage device 110 and the transmitting device 150, and the transmitting device 150 is connected to a user device 190.

For example, the bit rate optimization system 100 can be a server or a computer. The storage device 110 can be a hard disk device, a flash memory or other storage media. The processor 120 can be a central processor, a controller, or other processing circuit. The transmitting device 150 can be a network card or other network equipment. The user device 190 can be a desktop computer, a notebook, a tablet, a cell phone or other user device.

With respect to operation, the storage device 110 stores video. The processor 120 analyzes spatial complexity and temporal complexity of the video so as to evaluate a sensitivity of human eye to serve as a basis for determining a bit rate of the video. Subsequently, the processor 120 compresses the video according to the bit rate, and transmits the video which is compressed to the user device 190 through the transmitting device 150.

In one embodiment of the present disclosure, the processor 120 analyzes the video so as to obtain the spatial complexity and the temporal complexity of each of frames (includes each section of the frame).

In one embodiment of the present disclosure, the spatial complexity is amount or number of details of each of the frames of the video among spatial domain. Specifically, the spatial complexity is the amount or number of information of single frame in details, contrast, brightness, clarity, and color tones. For example, if a frame has clear scenery which includes leaf in woods and water ripple, the amount or number of information among spatial complexity is high; if a frame is a scenario of animation and most part of the frame is composed of large same color blocks, the amount or number of information among spatial complexity is low.

In one embodiment of the present disclosure, the temporal complexity is amount of movement of an object of the video among timeline. Specifically, the video is composed of a large number of continuous frames, and the motion is the movement among consecutive frames. The temporal complexity is the amplitude of motion. For example, the scene is not quite stabilized and moved fast in the video for a few seconds when exciting part of action film occurs. At this time, the amplitude of motion of the case represents a high temporal complexity.

In one embodiment of the present disclosure, the processor 120 determines whether the spatial complexity cooperating with the temporal complexity is sensitive to human eye through a vision evaluating formula, such that sensitive information of human eye of each of frames of the video is obtained.

Specifically, the vision evaluating formula: a vision sensitivity is determined according to motion vector, brightness, and chroma of frame sections (frame is divided into N×N frame sections) and the spatial complexity, wherein N can be 16 or other positive integer.

For example, based on statistical data obtained from the sensitivity of human eye of predetermined viewers, a high motion vector (hight_mv), a low motion vector (low_mv), a high sensitive luminance (high_luma), a low sensitive luminance (low_luma), a high spatial complexity (high_spatial_coml), a low spatial complexity (low_spatial_coml) can be defined.

As can be seen above, high sensitivity: motion vector (mv)>high_mv, brightness>high_luma, spatial complexity>high_spatial_compl. Low sensitivity: motion vector (mv)<low_mv, brightness<low_luma, spatial complexity<low_spatial_compl.

In one embodiment of the present disclosure, the processor 120 executes a standardization process to the sensitive information of human eye of each of frames of the video, and the sensitive information of human eye of each of frames of the video is substituted into a predetermined weight formula so as to obtain the bit rate.

With respect to the predetermined weight formula, for example, a complexity average of all frames is defined as "average complexity," "high complexity threshold" is defined as "average complexity×2;" and predetermined weight formula="average complexity"+(average complexity of frames which conform high complexity threshold)×(ratio of number of frames which conform high complexity threshold to number of all frames)×2.

Subsequently, complexity value obtained from predetermined weight formula is substituted by the processor 120 so as to obtain corresponding bit rate based on a build-in form of relation between complexity and bit rate stored in the storage device 110.

For example, the relation between the complexity and the bit rate can be collected from the sensitivity of human eye of viewers, wherein the higher the complexity is, the higher the bit rate will be; the lower the complexity is, the lower the bit rate will be. Bit rate corresponding to predefined complexity is set according to image quality which can be accepted by most of the viewers. If set bit rate is lower than the bit rate corresponding to the predefined complexity, most of the viewers may feel that the image quality is bad. In addition, the relation between the complexity and the bit rate can be obtained by software simulating; however, the present disclosure is not limited thereto, those skilled in the art can choose suitable method to obtain the relation between the complexity and the bit rate depending on actual requirements.

Figure 2:
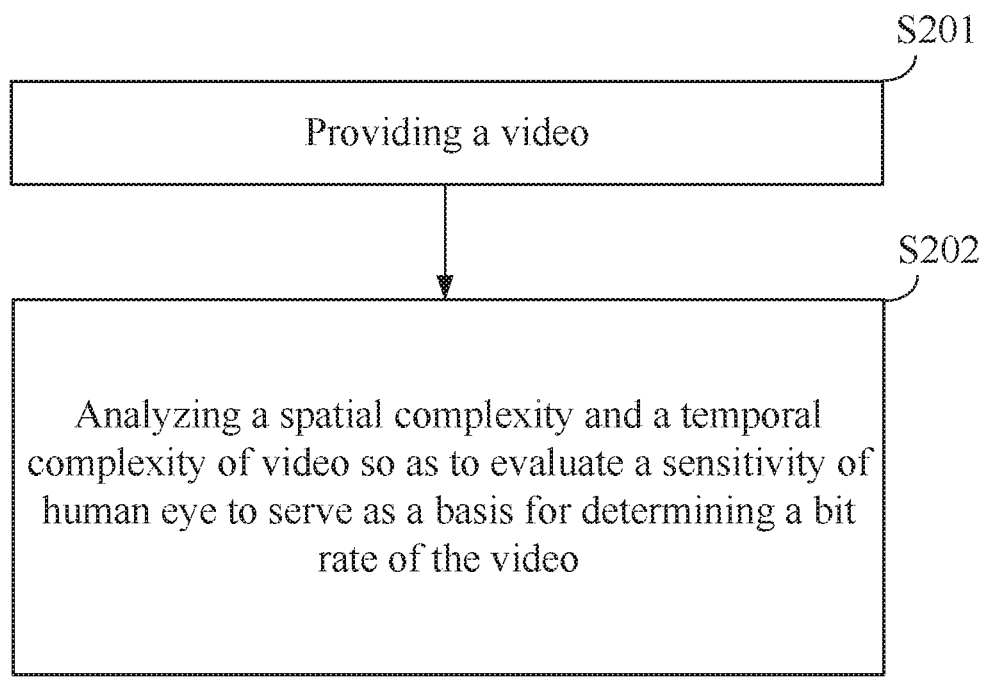
FIG. 2 is a flow diagram of a bit rate optimization method according to some embodiments of the present disclosure.

For facilitating the understanding of operations of the bit rate optimization system, reference is now made to FIG. 1 and FIG. 2. FIG. 2 is a flow diagram of a bit rate optimization method 200 according to some embodiments of the present disclosure. As illustrated in FIG. 2, the bit rate optimization method 200 includes steps S201~S202 (it is noted that unless sequence of steps as described in the embodiment is specific limited, other sequence of steps can also be set according to actual requirements. In addition, all of the steps can be executed at the same time, or part of the steps can be executed at the same time).

In step S201, a video is provided; in step S202, a spatial complexity and a temporal complexity of video is analyzed so as to evaluate a sensitivity of human eye to serve as a basis for determining a bit rate of the video.

In the bit rate optimization method 200, the spatial complexity is amount or number of details of each of frames of the video among spatial domain.

In the bit rate optimization method 200, the temporal complexity is amount of movement of an object of the video among timeline.

In one embodiment of the present disclosure, analyzing sensitivity of human eye in step S202 includes: determining whether the spatial complexity cooperating with the temporal complexity is sensitive to human eye through a vision evaluating formula, such that sensitive information of human eye of each of frames of the video is obtained.

In one embodiment of the present disclosure, serving as the basis for determining the bit rate of the video in step S202 includes: executing a standardization process to the sensitive information of human eye of each of frames of the video, and substituting the sensitive information of human eye of each of frames of the video into a predetermined weight formula so as to obtain the bit rate.

In view of the above embodiments of the present disclosure, it is apparent that the application of the present invention has the advantages as follows. The embodiment of the present disclosure provides a bit rate optimization system and a bit rate optimization method, which allows the bit rate optimization system to choose appropriate bit rate automatically and optimize the transmission bandwidth of the internet, and views could enjoy the high quality viewing experience through internet under low bandwidth.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A bit rate optimization system, comprising:
   a storage device configured to store a video; and
   a processor electrically connected to the storage device, wherein the processor analyzes a spatial complexity and a temporal complexity of the video so as to evaluate a sensitivity of human eye to serve as a basis for determining a bit rate of the video, wherein the processor determines whether the spatial complexity cooperating with the temporal complexity is sensitive to human eye through a vision evaluating formula, such that a sensitive information of human eye of each of frames of the video is obtained, wherein the processor executes a standardization process to the sensitive information of human eye of each of frames of the video, and the sensitive information of human eye of each of frames of the video is substituted into a predetermined weight formula so as to obtain the bit rate, wherein the predetermined weight formula is:
   (first average complexity of all frames of the video)+ (second average complexity of frames of the video which conform high complexity threshold)×(ratio of number of frames of the video which conform the high complexity threshold to number of all frames of the video)×2,
   wherein the high complexity threshold is (the first average complexity)×2.

2. The bit rate optimization system of claim 1, wherein the spatial complexity is information quantity of each of frames of the video among spatial domain.

3. The bit rate optimization system of claim 1, wherein the temporal complexity is amount of movement of an object of the video among timeline.

4. A bit rate optimization method, comprising:
   providing a video; and
   analyzing a spatial complexity and a temporal complexity of the video so as to evaluate a sensitivity of human eye to serve as a basis for determining a bit rate of the video,
   wherein a step of evaluating the sensitivity of human eye comprises: determining whether the spatial complexity cooperating with the temporal complexity is sensitive to human eye through a vision evaluating formula, such that a sensitive information of human eye of each of frames of the video is obtained,
   wherein a step of serving as the basis for determining the bit rate of the video comprises:
   executing a standardization process to the sensitive information of human eye of each of frames of the video, and substituting the sensitive information of human eye of each of frames of the video into a predetermined weight formula so as to obtain the bit rate, wherein the predetermined weight formula is:
   (first average complexity of all frames of the video)+ (second average complexity of frames of the video which conform high complexity threshold)×(ratio of number of frames of the video which conform the high complexity threshold to number of all frames of the video)×2,
   wherein the high complexity threshold is (the first average complexity)×2.

5. The bit rate optimization method of claim 4, wherein the spatial complexity is information quantity of each of frames of the video among spatial domain.

6. The bit rate optimization method of claim 4, wherein the temporal complexity is amount of movement of an object of the video among timeline.

* * * * *